UNITED STATES PATENT OFFICE.

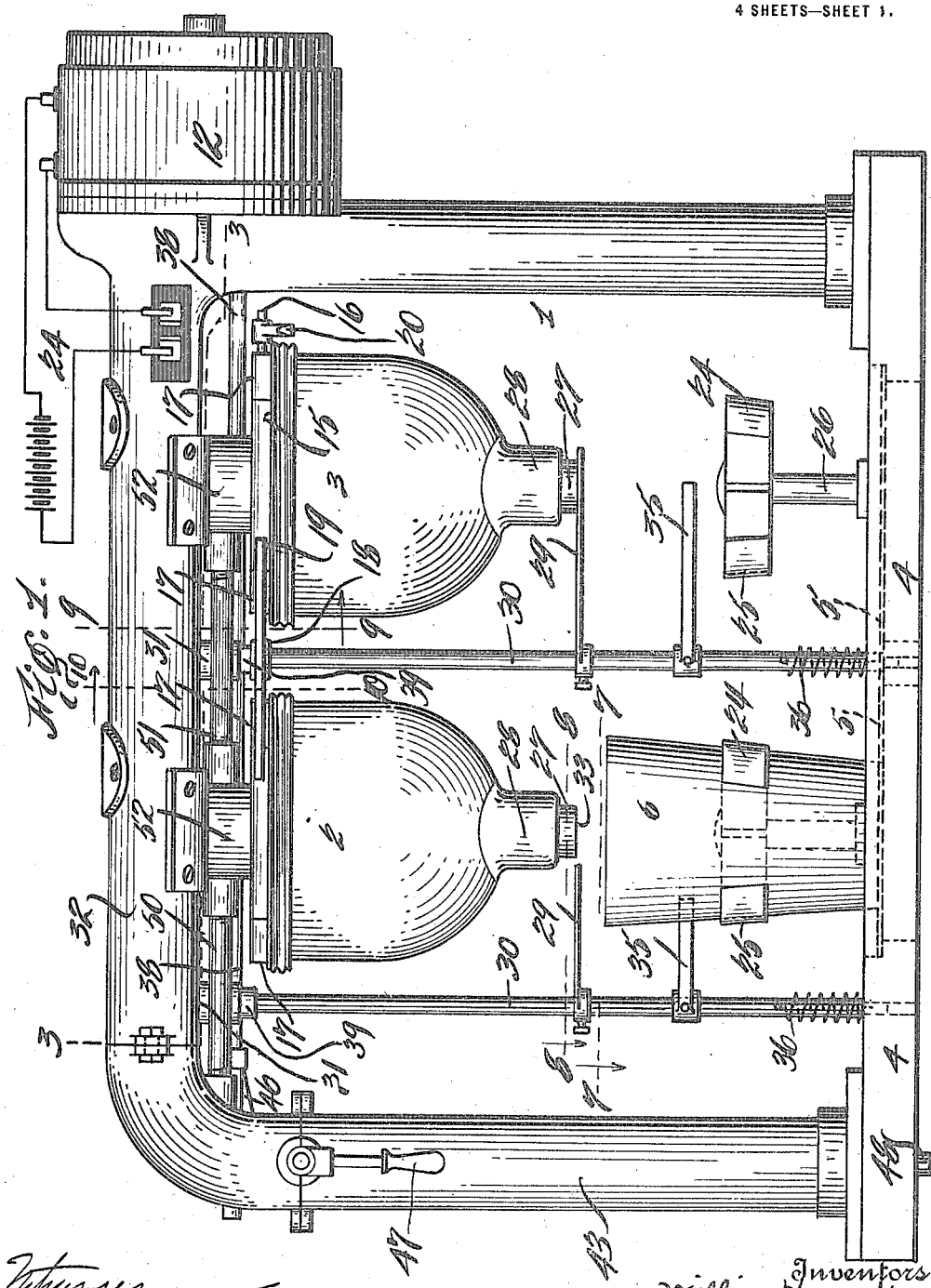

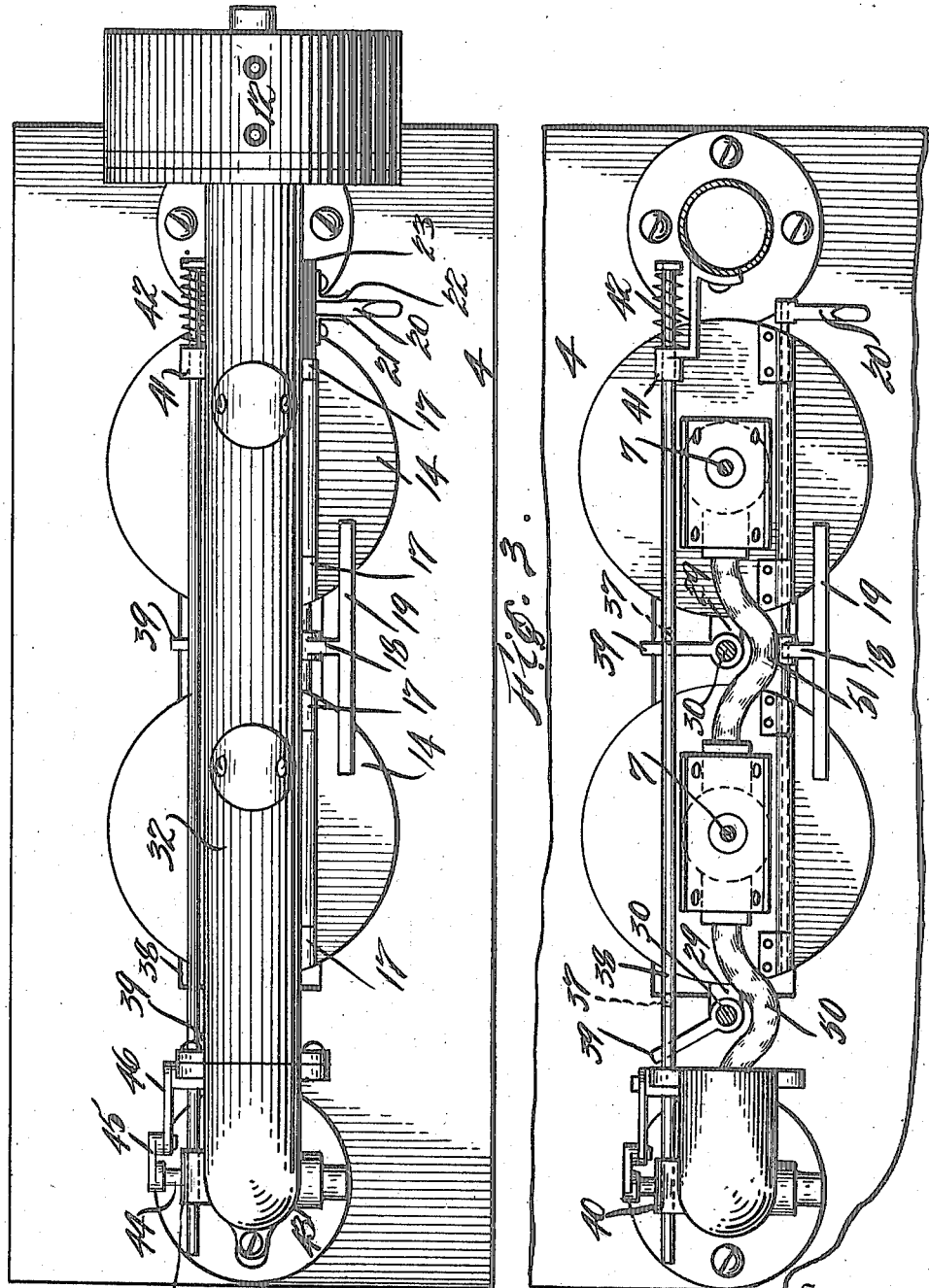

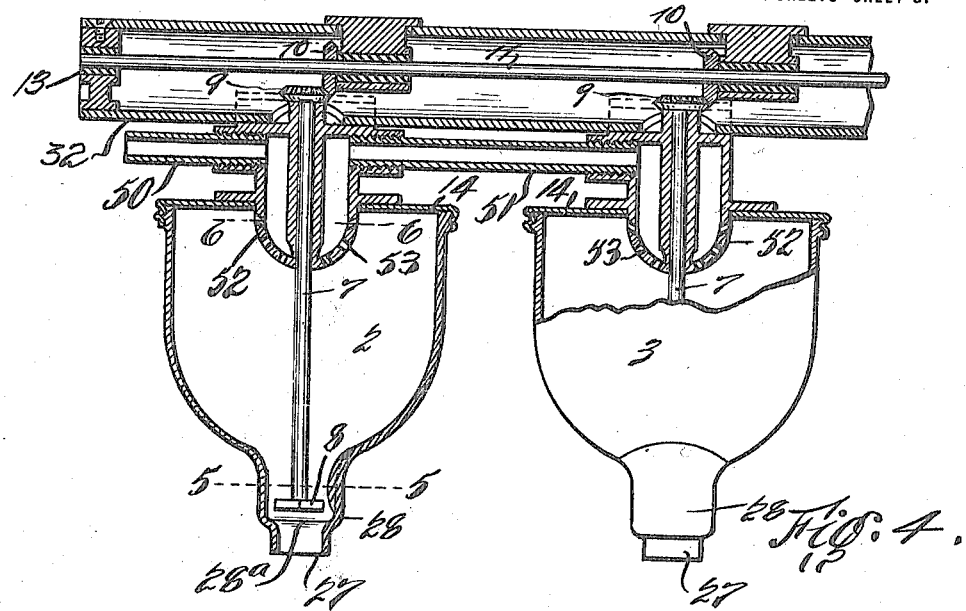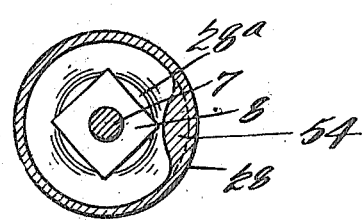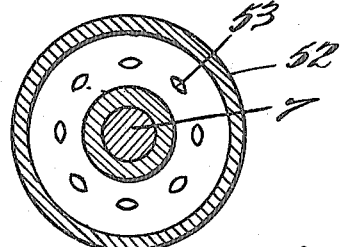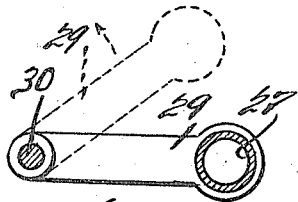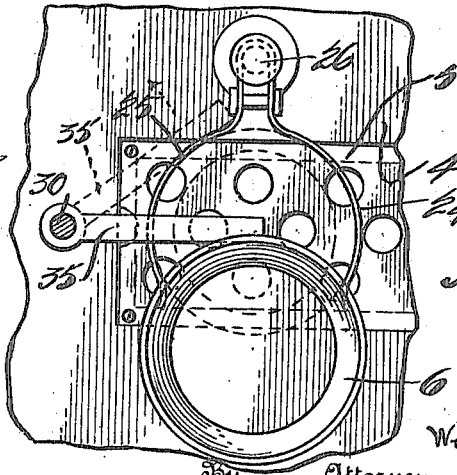

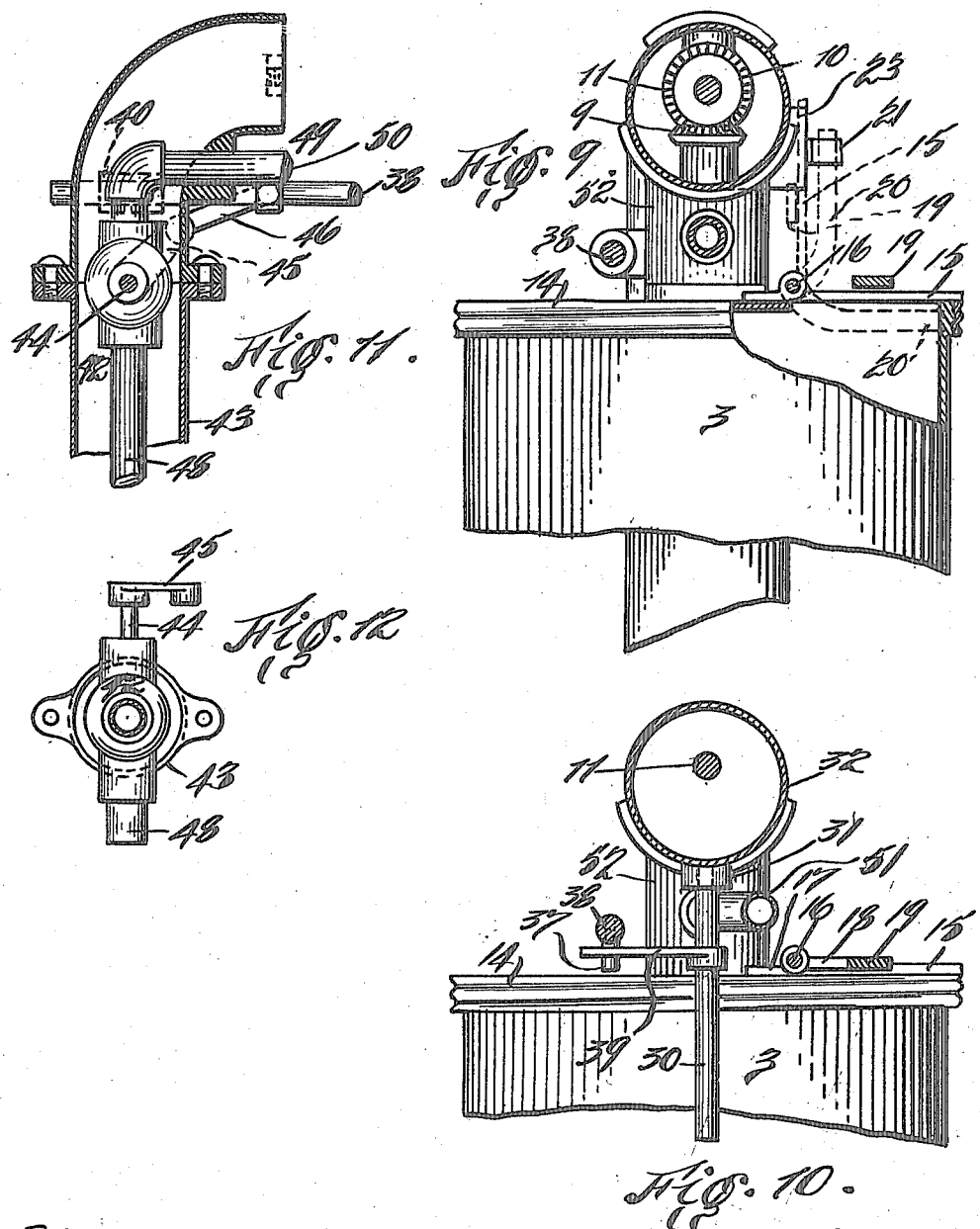

WILLIAM H. HOWARD, OF PORT CHESTER, AND BURT E. TAYLOR, OF MOUNT VERNON, NEW YORK.

MIXING DEVICE FOR BEVERAGES.

1,249,403.

Specification of Letters Patent.

Patented Dec. 11, 1917.

Application filed September 14, 1917. Serial No. 191,382.

*To all whom it may concern:*

Be it known that we, WILLIAM H. HOWARD and BURT E. TAYLOR, citizens of the United States and residents of Port Chester and Mount Vernon, respectively, in the county of Westchester and State of New York, have invented certain new and useful Improvements in Mixing Devices for Beverages, of which the following is a specification.

This invention relates to improvements in devices for mixing beverages such as malted milk and the like. One of the chief objects of the invention is to provide a device of this nature that will be sanitary, easily washed and, at the same time, thoroughly mix the beverages placed therein. To carry out the invention, a mixer is provided and arranged so that the mixing chamber is normally closed, thereby preventing the entrance of flies or any foreign matter. The device is designed in a manner to keep the mixing element inclosed at all times. Special means are provided to cleanse the chamber at will by the introduction of water thereinto.

A further feature of the invention resides in the provision of means to coöperate with the mixer or beater to thoroughly mix the beverage. To thoroughly mix the beverages, it is necessary to cause the several elements to come close to each other. To accomplish this result, a projection is provided which acts to break up the swirl adjacent or around the beater.

Figure 1 is a side elevation of the mixer;

Fig. 2 is a plan view thereof;

Fig. 3 is a sectional plan view, the section being taken on a line 3—3 in Fig. 1;

Fig. 4 is a section detail view, the section being taken on a line 4—4 in Fig. 9;

Fig. 5 is an enlarged sectional plan view of the spout of the mixing chamber, the section being taken on a line 5—5 in Fig. 4;

Fig. 6 is a similar view of the water spraying device, the section being taken on a line 6—6 in Fig. 4;

Fig. 7 is a detail sectional plan view, illustrating the action of uncovering the spout of the mixing chamber by the insertion of a glass, the section being taken on a line 7—7 in Fig. 1;

Fig. 8 is a similar view, illustrating the movement of the valve for the spout of the mixing chamber, the section being taken on a line 8—8 in Fig. 1;

Fig. 9 is an enlarged fragmentary sectional view, the section being taken on a line 9—9 in Fig. 1;

Fig. 10 is a similar view, the section being taken on a line 10—10 in Fig. 1;

Fig. 11 is an enlarged fragmentary sectional view, the section being taken on a line 11—11 in Fig. 2;

Fig. 12 is a top plan view of the lower portion of the tubular standard at the left of the machine, as seen in Fig. 1, the water controlling valve being also illustrated.

As herein embodied, the device consists of a tubular supporting standard 1 carrying mixing chambers 2 and 3. In this instance two chambers are illustrated but any desired number can be employed. The standard 1 is carried by a bed plate 4 provided with a screen 5 located under the chambers 2 and 3, see also Fig. 7, upon which the glasses to be filled, one of said glasses being indicated by 6 in Fig. 1, are placed.

Each chamber 2 and 3 surrounds a shaft 7 carrying any suitably shaped mixer 8. The upper end of each shaft 7 carries a gear 9 meshing with a gear 10 carried by an operating shaft 11. Said operating shaft being connected at one end thereof to an electric motor 12 (Fig. 1). The opposite end of the shaft 11 is journaled in a bearing 13, see Fig. 4. It will be evident that the mixers in each chamber 2 and 3 are operated in unison.

Each chamber 2 and 3 carries a cap 14 having a door 15, see Figs. 1 and 9. Each door 15 is loosely mounted upon a shaft 16 which rotatably connects the doors to their respective caps 14. The shaft 16 is rotatably supported by blocks 17 on the caps 14. The shaft 16 also carries a lever 18 having a head 19 which overlaps each door 14, see Figs. 2 and 3. One end of the shaft 16 carries a circuit closing arm 20 acting as a switch in combination with the switch blades 21 and 22 mounted on the block 23 of insulating material. The blades 22 and 23 are electrically connected to the motor 12 and a source of electrical energy 24 (Fig. 1). Whenever a door 14 is raised for the purpose of permitting a beverage to be mixed to be placed in one or both mixing chambers, the lever 18 will be raised, causing the arm 20 to close the circuit for the motor 12, hence the mixers 8 will be set in motion. The dotted lines in Fig. 9 illustrate a door 14 in raised position, also the circuit closing arm 20. After a chamber has received its charge the door 14 therefor will be closed but the arm 20 will remain between the blades 21 and 22, hence the motor and mixers will combine to operate until the circuit is broken by the operator. The circuit will be broken by restoring the lever 18 to its normal position, indicated in Fig. 10. After a charge has been placed in the chamber or the chambers the operator will press a glass (indicated 6) into the clamp formed by the yieldable jaws, or blades 24 and 25 Fig. 7, which are carried by a post 26. Each chamber has in alinement therewith a pair of the jaws or blades.

To normally close the nozzle 27 of the spout 28 of each mixing chamber 2 and 3, we provide gates or valves 29, said gates or valves being secured, at one end thereof, to a vertical shaft 30, Fig. 1, journaled at the lower ends in the bed plate 4 and at their upper ends in a bearing 31, carried by the horizontally disposed member 32 of the support 1 (Figs. 1 and 10). The gates or valves 29 are positioned to snugly fit the face 33 of the nozzles 27, said face and surface 34 of the gates being ground to provide a substantially air-tight joint when said gates or valves are closed, as shown in Fig. 8.

Each shaft 30 also carries a lever 35 alining with the gates on its shaft. When the gates are closed, the levers 35 will be positioned, as shown by full lines Fig. 7 over the center of its adjacent glass receiving clamp. After a chamber has received its charge of liquid, and the motor started, as hereinbefore described, a glass will be pressed into a clamp which action will swing the lever 35 to the dotted line, position Fig. 7, rotate its shaft 30 and move the gate 29 carried thereby away from the nozzle of the adjacent mixing chamber, as indicated by dotted lines Fig. 8. After which the mixed beverage will flow into the glass. When the glass is withdrawn from the clamp, the gates will automatically close by the action of a spring 36 (Fig. 3) pins 37, on a normally stationary but reciprocatable rod 38, located above the mixing chambers 2 and 3 (see Figs. 3, 9 and 10) will act as stops when the arm 39 on each shaft 30 strikes same. The function of the rod 38 and pins 37 is to open the gates 29, by rotating the shafts 30, when the chambers are to be flushed or cleansed. As has been stated, the rod is arranged for reciprocation, the same being slidable, supported by bearing blocks 40 and 41. A spring 42 is provided to restore the rod to its normal position after said rod has been moved to open the said gates. The rod 38 is arranged to be moved to the left, in this instance, simultaneously with the opening of a water controlling valve 42 located within the left vertical member 43 of the standard 1. The stem 44 of the valve 43 projects through the said standard member, as shown in Fig. 12, one end of which carries a crank arm 45 connected by a link 46 to the shaft 38. The other end of the stem 44 carries one operating handle 47 Fig. 1. When the water is turned on, by manipulating the handle 47, the rod 38 will be moved to the left, causing the pins 37 to rotate the shaft 30, thereby turning the gates away from the nozzles 37, thereby allowing the water to flow through the chambers and into the screen 4 through which it will drain off.

The valve 42 has connected therewith a water supplying duct consisting of an inlet portion 48 and an outlet portion 49. The outlet portion 49 consists of a nipple 50, which places the chamber 2 in communication with the valve 42 (see Fig. 4) and a nipple 51, which places the chamber 3 in communication with the valve 42. Each chamber, 2 and 3, has associated therewith a water spraying chamber 52. Each chamber 52 is provided with a plurality of relatively small openings 53 through which the water is forced. As can be seen in Fig. 4, the nipples 50 and 51 are connected to the water spraying chambers 52, hence when the water is turned on, it will flow into chambers 2 and 3, thence out through the spouts 28, thereby flushing the chambers and cleaning the mixers 8. To produce a perfect mixing of the liquids, within the chambers, means are provided to break up the whirl of the liquid adjacent the mixers 8. To accomplish this result, the wall of the nozzle 28 is built out as at 54, (Figs. 4 and 5). When a cylindrical chamber is employed in combination with a mixer, such for instance as an ordinary glass, the rapid rotation of the mixer causes a whirlpool which has no mixing action as the ingredients merely rotate and do not commingle, but by the provision of the projection 54, the whirlpool is broken up. In other words, when the rotating liquids strike the projection 54, they will be directed or splashed toward the spindle 7, which causes them to mix more thoroughly than if allowed to merely rotate without changing the direction of their path of movement.

One of the broad features of this mixer is the location of the agitator, or beater, 8 in the restricted passage or neck 28. While the agitator is rotating, the liquid will not flow from the chamber even though the gate 27 be open, excepting in a small stream. The agitator holds back the liquid, or in other words, it is a throttling mixer which compels the liquids to become thoroughly mixed. The flow of the liquid into the glass is controlled by distance of agitator 8 from shoulder 28ª of neck 28.

Having now described our invention, what we claim as new and desire to secure by Letters Patent is the following, viz:

1. In a beverage mixing apparatus, a container for the ingredients of the beverages containing a downwardly extending mixing chamber having an inlet and an outlet and comprising a therefrom downwardly extending restricted passage to said outlet, in combination with a rotatory disk located in said passage, the diameter of the disk being slightly less than the diameter of said passage.

2. In a beverage mixing apparatus, a container for the ingredients of the beverages containing a downwardly extending mixing chamber having an inlet and an outlet and comprising a therefrom downwardly extending restricted passage to said outlet, in combination with a rotatory disk located in said passage, the diameter of the disk being slightly less than the diameter of said passage, and a deflecting member projecting from the side of said passage toward said disk.

3. In a beverage mixing apparatus a chamber, a spout extending therefrom, a nozzle extending from said spout, the diameter of the nozzle being less than the diameter of the spout, whereby an annular shoulder is formed, and a rotatory mixing device comprising a flat disk located within the spout and adjacent said shoulder whereby the passage for the escape of liquids from the chamber is restricted.

4. In a beverage mixing apparatus a chamber, a spout extending therefrom, a nozzle extending from said spout, the diameter of the nozzle being less than the diameter of the spout, whereby an annular shoulder is formed, a rotatory mixing device comprising a flat disk located within the spout and adjacent said shoulder whereby the passage for the escape of liquids from the chamber is restricted, and a projection carried by the spout extending toward the center thereof, said projection acting to direct the liquid toward the center of said spout to break up the whirl caused by the rotating mixer.

5. In a beverage mixing apparatus a chamber, a spout leading therefrom, a valve to normally close the opening in said spout, said valve being located exteriorly of the spout and arranged to be moved entirely away therefrom, means operable by the insertion of a glass under said spout to move said valve away from said spout, and a mixing device within said chamber.

6. In a beverage mixing apparatus, a chamber, a duct connected to said chamber for the introduction of a cleansing liquid into said chamber, a valve to control the flow of liquid through said duct, a spout leading from said chamber, a valve to normally close the opening in said spout, means to operate said valve to permit the cleansing liquid to flow through said chamber simultaneously with the operation of the valve in said duct to permit of the flow of the cleansing liquid into said chamber, and a mixing device within the chamber.

7. In a beverage mixing apparatus a chamber, a restricted spout portion extending therefrom, a nozzle extending from the spout, the diameter of the nozzle being less than the diameter of the spout, and a rotatory mixing device within the spout portion consisting of a disk having horizontally disposed upper and lower surfaces, said disk being positioned adjacent the juncture of the spout and nozzle.

8. In a beverage mixing apparatus a chamber, a restricted passage at one end thereof, said passage being provided with a restricted opening in the bottom thereof, to form an annular shoulder, and a rotatory disk located within the restricted passage adjacent said annular shoulder, said mixing device, while being rotated, acting to form a whirl of the beverages to be mixed whereby said beverages are throttled against too rapid escape through said restricted passage.

9. In a beverage mixing apparatus a chamber, a restricted passage at one end thereof, said passage being provided with a restricted opening in the bottom thereof, to form an annular shoulder, a rotatory disk located within the restricted passage adjacent said annular shoulder, said mixing device, while being rotated, acting to form a whirl of the beverages to be mixed whereby said beverages are throttled against too rapid escape through said restricted passage, and means adjacent the mixing device to direct the whirling beverages toward the center of the passage.

10. In a beverage mixer, a chamber having an opening, a rotatory imperforate disk in said chamber located sufficiently close to the opening to retard the flow of the beverage through said opening.

11. In a mixing device for liquids, a chamber having an opening, a rotatable imperforate mixing member located adjacent the opening, said mixing member when rotated acting to whirl the liquids to be mixed in a horizontal plane, said opening being restricted only by the proximity of the rotatable mixing member.

12. In a mixing device for liquids, a chamber having an outlet, a rotatable mixing element within the chamber located adjacent said outlet, arranged to impart to the liquids a circular movement in a horizontal plane, whereby said liquids are prevented from flowing through said opening, too rapidly, by centrifugal force, said opening being unrestricted when the mixing device is in motion.

WM. H. HOWARD.
BURT E. TAYLOR.

Witnesses:
BENJ. I. TAYLOR,
ADELE M. MERRITT.

Copies of this patent may be obtained for five cents each, by addressing the "Commissioner of Patents, Washington, D. C."